Aug. 26, 1969 W. M. VAN SYOC 3,463,510
TRACTOR-IMPLEMENT WEIGHT-TRANSFER DRAFT SYSTEM
Filed Nov. 30, 1967
3 Sheets-Sheet 1

*INVENTOR.*
W. M. VAN SYOC

INVENTOR.
W.M. VAN SYOC

Aug. 26, 1969  W. M. VAN SYOC  3,463,510
TRACTOR-IMPLEMENT WEIGHT-TRANSFER DRAFT SYSTEM
Filed Nov. 30, 1967  3 Sheets-Sheet 3

*INVENTOR.*
W. M. VAN SYOC

_United States Patent Office_ 3,463,510
Patented Aug. 26, 1969

3,463,510
TRACTOR-IMPLEMENT WEIGHT-TRANSFER DRAFT SYSTEM
Wendell Mason Van Syoc, Cedar Falls, Iowa, assignor to Deere & Company, Moline, Ill., a corporation of Delaware
Filed Nov. 30, 1967, Ser. No. 687,007
Int. Cl. B60d *1/00;* B62d *53/00;* A01b *63/112*
U.S. Cl. 280—405
13 Claims

ABSTRACT OF THE DISCLOSURE

A weight-transfer mechanism for a tractor-implement unit in which the remote hydraulic motor of the tractor power lift system is employed to vary lifting forces on the trailing implement so as to selectively transfer part of the implement weight to the tractor to improve traction.

BACKGROUND OF THE INVENTION

The invention relates to tractor-implement trains and more particularly to a tractor-implement relationship in which the implement is of the trailing type as distinguished from that mounted directly on the tractor, the distinction being mainly one of the amount of implement weight that is initially borne by the wheels or other ground-engaging means of the implement.

It is known, of course, from the so-called Ferguson draft control and improvements thereon, to adjust the vertical position of a tractor-mounted implement in response to changes in draft force, the general operation being based on variations in plowing depth, for example, so as to maintain a substantially constant draft force. Although these systems involve a measure of weight transfer between the implement and tractor so as to vary the tractive ability of the tractor, the problems in trailing or drawn implements are somewhat different, because little if any of the implement weight is initially borne by the tractor and vertical adjustment of the tractor draft links usually merely raises and lowers the implement tongue. Various efforts have been made to modify tractor hitch structures so as to obtain weight-transfer benefits in the field of tractor drawn implements and vehicles, but none of these seem to have become commercially satisfactory, because of defects in design, application of incorect principles and so forth.

SUMMARY OF THE INVENTION

According to the present invention, the remote cylinder of the tractor hydraulic power system is utilized as the means for accomplishing the weight transfer between the tractor and the trailing implement. In achieving the end result, the remote cylinder is made to be operable independently and even exclusively of the tractor-mounted or rockshaft cylinder. Suitable valve means are employed for diverting fluid pressure to the remote cylinder after the rockshaft cylinder has, for example, been used to selectively obtain the proper working height of the hitch means, conventionally in the form of draft links, as in the case of a so-called three-point hitch. The invention further features the adaptation of the use of the remote cylinder in a hydraulic power system of the type including draft control mechanism of the usual character that is sensitive to changes in draft forces between the tractor and implement. This renders operation of the weight-transfer mechanism automatic through the remote cylinder. A further feature of the invention is the utilization of a hitch means adapter, braced against relative fore-and-aft shifting, and having at one end thereof means for connecting one end of the remote cylinder, the other end of the cylinder being connected to a rearward point on the implement tongue, and further the hitch adapter is of open-work construction so as to accommodate a power take-off line that runs to the implement.

DESCRIPTION OF FIGS. 1-4

Figure 1:
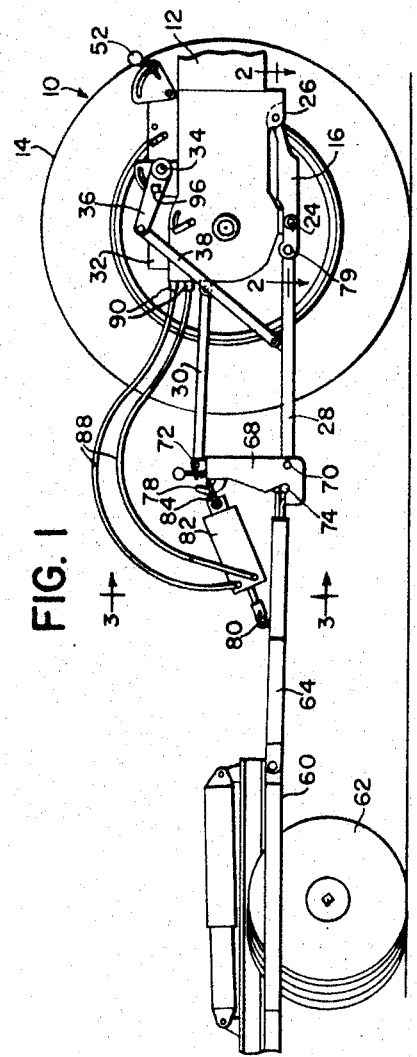
FIG. 1 is a fragmentary side view, with portions omitted, showing a typical arrangement between a tractor and trailing implement in which the remote cylinder is used as the means for accomplishing weight-transfer between the implement and the tractor.

The portion of the tractor illustrated is designated generally by the numeral 10 and includes a rear body 12 carried on a pair of traction wheels, only one of which appears at 14.

Below the tractor is mounted an A-frame 16 of known construction, the tractor body 12 having a rear depending portion 18 in which is supported a transversely elongated elastic bar 20, the opposite end portions of which are fulcrumed at 22 so that terminal end portions laterally overhang as at 24 and project into respective opposite side portions of the A-frame 16. The forward portion of the A-frame is mounted by a pin and slot means 26 to an underpart of the body 12 so that the A-frame may have limited fore-and-aft movement as the overhanging ends 24 of the bar 20 deflect, as when load is applied to the A-frame by a pair of lower draft links 28, these links, comprising, in combination with a single top link 30 to provide a three-point hitch of known construction.

The A-frame 16, together with the links 28 and 30, combine to establish hitch means on the tractor, which means is connected to or incorporated with draft control mechanism, to be presently described, for causing actuation of a tractor-mounted motor or rockshaft cylinder 32 (FIG. 4) which conventionally causes rocking of a tractor-mounted rockshaft 34 which is provided at its opposite ends with lift arms 36 that are connected respectively by lift links 38 to the lower draft links 28.

Figure 4:
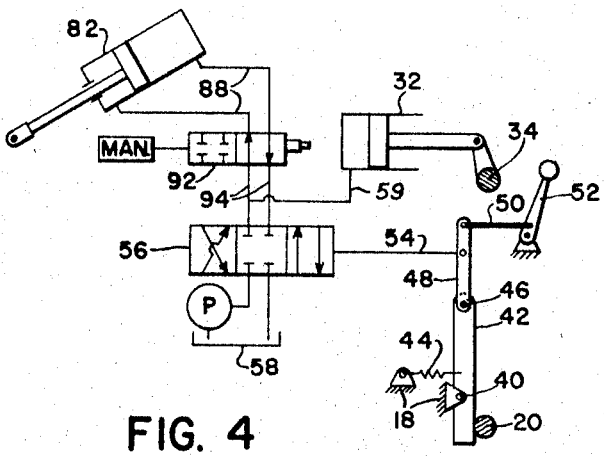
FIG. 4 is a schematic of a typical hydraulic circuit.

The draft control mechanism is shown here as being of known construction, the input or signal means comprising in the first instance the midportion of the elastic bar 20; that is to say, as the outer or overhanging ends 24 of the bar 20 are deflected rearwardly, as by tensional draft forces applied through the lower links 28, the midportion of the bar 20 will of course deflect forwardly, and this in turn causes a response from the draft control mechanism of FIG. 4 to port fluid to or from the rockshaft cylinder 32, thereby raising or lowering the draft links 28 accordingly.

For the accomplishment of this result, there is pivoted at 40, within the tractor body portion 18, a signal lever 42, the lower end of which is urged against the midportion of the bar 20 by a light spring 44. The upper end of the lever 42 is pivotally connected at 46 to the lower end of a secondary lever 48, the upper end of which is linked at 50 to a hand lever or manual control 52, located in ready accessibility to the tractor operator, all as is conventional. The midportion of the secondary lever 48 is linked at 54 to a main control valve 56 which has three positions (FIG. 4) for porting fluid to and from a pump P or a reservoir 58. As is conventional, the rockshaft cylinder 32 may be of the one-way type, having a fluid line 59 leading to the valve 56. To the extent described, and ignoring other portions of FIG. 4, it will be seen that when the position of the valve 56 changes to either side of its neutral position as illustrated, fluid will be ported to and from the rockshaft cylinder 32 so as to cause rocking of the rockshaft 34. The movement of the valve may be responsive to changes in draft force via the bending bar 20, lever 42, lever 48 and link 54, or it may be instituted manually through the control lever 52, all of which constitutes control means for the rockshaft cylinder 32. In a conventional construction, and particularly in the case of a tractor-mounted implement, the implement, such as a plow, would be mounted directly on the hitch linkage 28–30 and variations in draft force would be utilized to adjust the hitch means vertically so as to maintain substantially a constant draft force.

Figure 3:
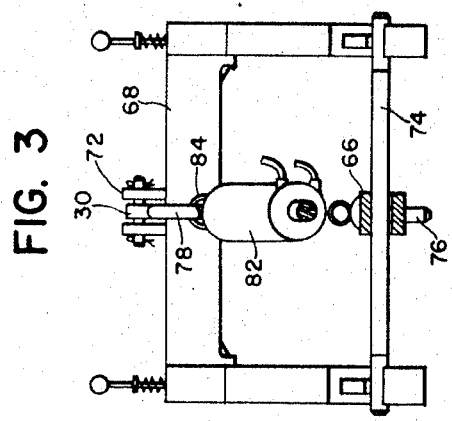
FIG. 3 is a rear elevation, partly in section and drawn to an enlarged scale, as seen generally along the line 3—3 of FIG. 1.

In the present case, the hitch means is applied to a trailing implement, here shown as a disk harrow including a main frame 60 and ground-engaging means 62. By way of substitution, the trailing implement could be a wheeled trailer in which the trailer wheels would be substituted for the harrow disks 62. The frame 60 has connected thereto a draft or implement tongue 64 having its forward end provided as a suitable clevis 66 (FIG. 3). In order to adapt the hitch linkage 28–30 for connection to the clevis 66 of the implement tongue 64, there is provided a coupler or adapter 68 of known construction. This adapter is connected at its lower outer ends to the respective hitch links 28 as at 70 and is connected centrally at its upper portion at 72 to the rear end of the top link 30. A transverse bar 74 spans the lower ends of the coupler and is suitably connected thereto and also receives a hitch pin 76 which passes through the bar and through the clevis 66 of the implement tongue 64. Without more, the trailing implement is simply drawn by the tractor through the medium of the coupler 68 and draft links 28, the latter of which are pivotally connected at 79 to the A-frame 16. Changes in draft force could of course be used to change the angular position of the tractor rockshaft 34 but this would have little effect on the implement other than raising and lowering the forward end of the implement tongue 64. Accordingly, it is desired to utilize this construction and mode of operation for transferring part of the trailing implement weight to the tractor so as to improve the tractive ability of the tractor. For this purpose, the upper midportion of the coupler 68 is provided with a hook or first connector 78, which, as will be seen, is spaced vertically from the hitch connection at 66–76 to the hitch means. A second connector 80 is provided in the form of an eye or the like on the implement tongue rearwardly of the forward end connection 66–76. A conventional remote motor 82, comprising the usual cylinder-piston assembly, is connected between the two connectors 78 and 80 so as to cause the application of lifting forces between the tractor and implement. For purposes of facilitating the connection, one end of the motor 82 has a ring 84 received by the hook or connector 78 on the coupler and the other end of the motor has a ring 86 for connecting the motor clevis to the eye 80 on the implement tongue.

As is well known to those versed in the art, a remote cylinder is typically provided with an agricultural tractor as an adjunct to the rockshaft cylinder 32 and for the purpose of accomplishing the adjustment of implements associated with the tractor but not mounted directly thereon. Such an arrangement is illustrated here wherein the motor 82, here of the two-way type, has a pair of fluid lines 88 connected to the tractor hydraulic system by conventional couplings, as suggested at 90. In this particular case, the coupling arrangement may incorporate a valve 92 (FIG. 4) which is manually operable for shifting between two positions. In one position (other than that shown in FIG. 4) the fluid lines to the motor 82 are cut off, because the valve in that position intercepts the motor lines 88 and a pair of fluid lines 94 that extend from the outlet side of the main valve 56, one of these lines being in parallel with the rockshaft cylinder line 59. Thus, operation of the hydraulic system is effective to pressurize and depressurize only the rockshaft cylinder 32. However, when the valve is shifted to the position shown in FIG. 4, the valve connects the lines 94 and 88 so that operation of the main valve 56 pressurizes and depressurizes the remote cylinder 82.

Figure 9:
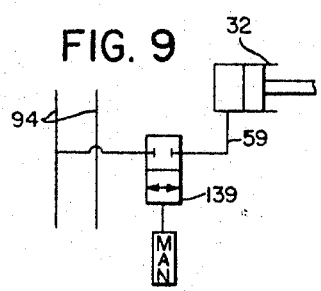
FIG. 9 is a fragmentary diagrammatic view illustrating a modification of FIG. 4.

In conjunction with this means, it is desirable to lock out the vertical adjustability of the hitch means 28–30. Typically, the operator will use the lever 52 to cause the circuit to rock the rockshaft 34 until the proper height of the lower links 28 has been secured. He will then close the valve 56 and mechanically, or hydraulically (see FIG. 9 described below), lock the arrangement so that the hitch links 28 cannot move vertically. This can be accomplished in any well-known manner, one form of lock being shown at 96 in FIG. 1. Another form of lock (hydraulic) is shown in FIG. 9 wherein a manually controllable valve 139 may be used to selectively open or close the line 59 to the cylinder 32, this valve being open when the valve 92 is closed (cylinder 32 effective) and vice versa (cylinder 82 effective). Therefore, with the hitch mechanically locked (or, alternatively, with the valve 139 closed), fluid pressure cannot be exchanged with the cylinder 32 and consequently, when the valve 92 is in its FIG. 4 position, the circuit and control means is effective only on the remote cylinder 82; that is to say, the motor 82 and its functions are substituted for the motor 32 and its functions, and the motor 82 therefore operates in response to or under control of the valve 56 as the valve positions change in response to manual control (lever 52, link 50, lever 48 and link 54) or draft control (bar 20, levers 42 and 48 and link 54). As will be seen, contraction of the motor 82 shortens the distance between the two connectors 78 and 80 and therefore exerts a lifting force on the implement tongue 64. This force is in turn transferred to the tractor through the top link 30 so that a selected portion of the implement weight can be transferred to the tractor for improving the tractive ability. This may be accomplished manually by the hand lever 52 or automatically through the draft control mechanism as previously described, the lower links 28 again acting in tension to cause deflection of the bar 20 for furnishing the signal to the draft control mechanism.

Increase in tractive ability of course includes reduction in wheel slip of the tractor. In using the present system with an offset disk harrow, for example, it has been found that wheel slip can be reduced by about 25%. The hill and swale characteristics of this arrangement are quite favorable. The hitch bar weight remains constant, because it is locked by the lock 96. The remote cylinder 82 is capable of extending and contracting and therefore allows the tractor and implement to float over hill and swale. As high draft loads are encountered, remote cylinder pressure increases and the tensile force in the top link 30 increases and tends to take away some of the draft that might pass through the lower links 28.

DESCRIPTION OF FIG. 5

In this form of invention, the tractor and implement are the same as those previously described. The distinction lies in the arrangement of the mechanism for transferring weight from the implement to the tractor. The basic result is, however, the same, because the function of the mechanism is to establish means for transmitting force between the tractor and implement.

Figure 2:
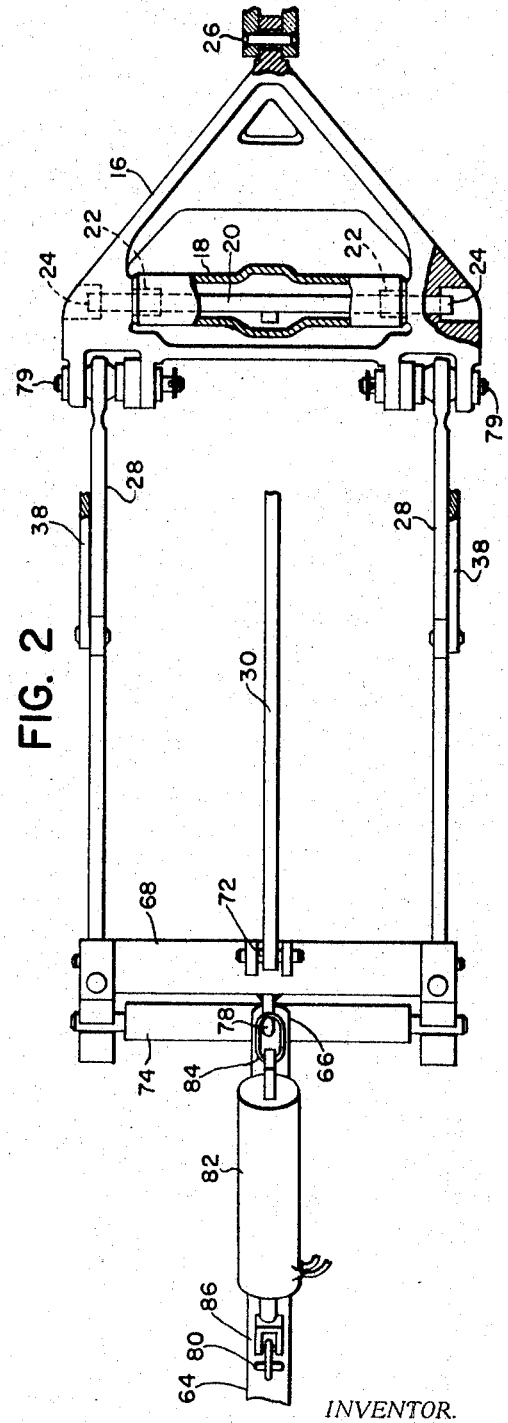
FIG. 2 is an enlarged plan view, partly in section as seen along the line 2—2 of FIG. 1.
Figure 5:
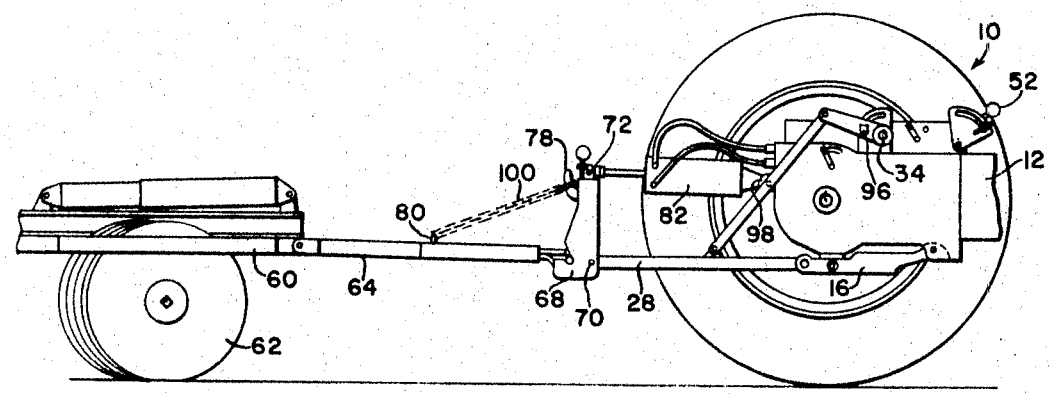
FIG. 5 is a modified form of arrangement in which the remote cylinder is connected between the tractor and a hitch adapter.
Figure 6:
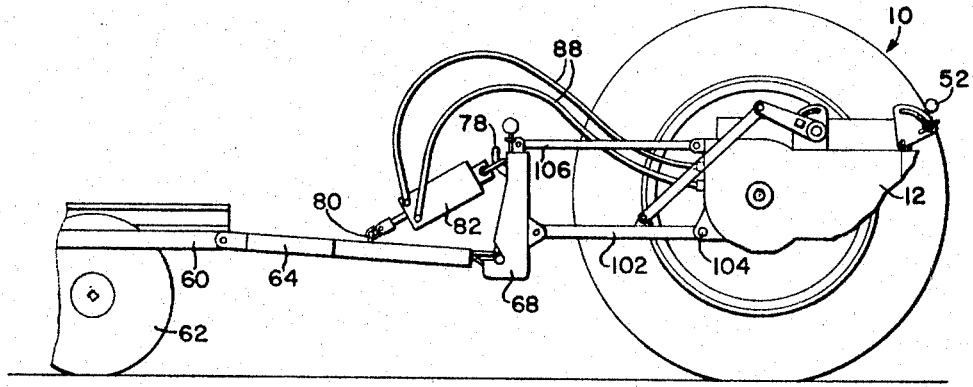
FIG. 6 is a further modification showing another use of the remote cylinder.

In this instance, the top link 30 is removed and the remote cylinder 82 is connected between the coupler connector 72 and the point 98 on the tractor to which the front end of the top link was formerly connected. A tension member, here in the form of a chain 100, is connected between the connector or hook 78 on the coupler and the eye or connector 80 on the implement tongue. In the case of FIGS. 1–3, the coupler 68 was braced by the top link 30 so as to be incapable of relative fore-and-aft shifting. In the case of FIG. 5, the coupler pivots at its connection 70 with the lower links 28 so that it can be moved by the remote cylinder 82, forwardly in the case of increased weight transfer as the remote cylinder 82 contracts and causes tensional force to be applied through the chain to the implement tongue 64.

DESCRIPTION OF FIG. 6

This form of the invention compares with that described above in connection with FIGS. 1–3 except the particular tractor is not equipped with automatic draft control mechanism. The tractor has its lower links 102 connected directly to the tractor at 104 and its top link 106 connected in a manner similar to the top link 30 in FIG. 1, here again the rear ends of the upper and lower links being connected to the coupler 68, between which and the implement tongue 64 the remote cylinder 82 is installed, having its fluid lines 88 coupled directly to the tractor and operated manually, as by the hand lever 52.

DESCRIPTION OF FIGS. 6 AND 7

The tractor here may be of the type shown in either FIGS. 1–3 or FIGS. 5 and 6, except that here the tractor is illustrated as having a power take-off shaft 108 of conventional nature. A trailing implement having a forwardly extending tongue 110 is trailed behind the tractor in such a manner that the forward end or clevis 112 of the tongue is at a level below that of the power take-off 108.

The hitch means in this case includes lower links 114, a usually adjustable top link 116 and a coupler 118 similar to the coupled 68 previously described. Because of the power take-off situation, the linkage, together with the coupler 118, has been elevated by rocking of the rockshaft 34 and locking of same by the mechanical lock 96 or by the hydraulic valve means 139 in a higher position than is indicated in the previously described figures. Because of this arrangement, a hitch adapter 120 is utilized, having a pair of transversely alined pintles 122 received by the coupler 118 and having an upper transverse pin 124 received by a top hook 126 on the coupler. The hitch adapter or frame 120 becomes essentially a rigid part of the coupler 118 and itself is provided with a connector 128 for connection of one end of the motor 82. The motor is provided at its other end with a tension member or chain 130 which in turn is connected to a second connector 132 on the implement tongue and comparable to the connector 80 previously described.

The adapter or frame 120 is of skeletal or open-work construction, having a pair of rigidly interconnected depending legs 134 which converge and are secured to a draft strap 136 to which the tongue clevis 112 is connected. This places the draft strap at a level below the line of the power take-off 108 and the opening provided by the frame-like nature of the adapter 120 easily accommodates a propeller shaft 138 that extends rearwardly from the power take-off 108 to any suitable drivable part (not shown) on the trailing implement.

Figure 7:
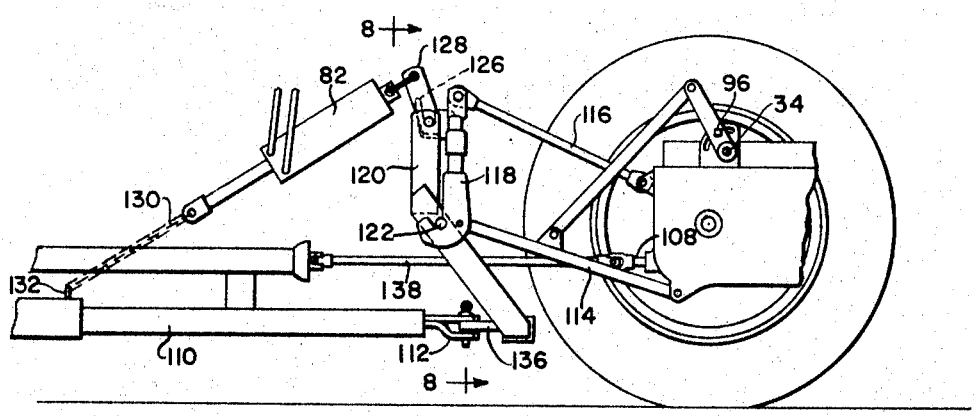
FIG. 7 is a further modification showing a hitch adapter designed to accommodate a power take-off line from the tractor to the implement.
Figure 8:
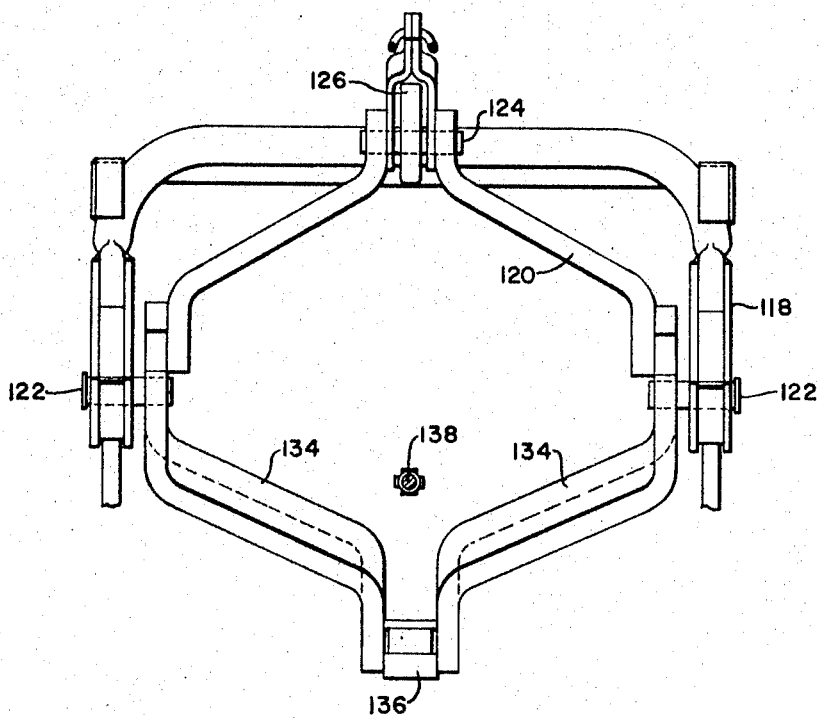
FIG. 8 is an enlarged view of the hitch adapter, as seen generally along the line 8—8 of FIG. 7.

Although the tractor shown in FIG. 7 does not necessarily import the inclusion of a draft control system, it will be clear that the arrangement of FIG. 7 could be readily used on the tractor of FIG. 1, for example, so as to incorporate the draft control characteristics.

As in the case of the previous embodiments, the arrangement here provides a simple and efficient mechanism for effecting weight transfer between the trailing implement and its towing tractor.

I claim:

1. For a tractor and trailing implement wherein the tractor has relatively low hitch means including trailing lower draft links and a power lift system including a remote extendible and contractible fluid motor and control means therefor and the implement has ground-engaging means supporting the weight thereof and a rigid draft tongue having a forward end draft-connected to the hitch means on a transverse pivot, the improvement comprising an upright member having an upper portion spaced above the draft links and rearwardly of the tractor and a lower portion connected to the draft links, means for selectively holding the draft links against vertical movement, force-receiving means including a portion on the draft tongue spaced rearwardly of said pivot, first and second force-transmitting means connected in series respectively between the tractor and said member upper portion and between said member and said tongue portion, one of said force-transmitting means including the aforesaid remote motor operative by said control means to act between the tractor and draft tongue portion through the media of said member and said other force-transmitting means to selectively apply raising and lowering forces to the draft tongue portion.

2. The invention defined in claim 1, in which the remote motor is connected between said member upper portion and said draft tongue portion and the other force-transmitting means is an upper link connected between said member upper portion and the tractor.

3. The invention defined in claim 2, in which the tractor includes a tractor-mounted motor for vertically adjusting the draft links, the connections of the member to the draft and upper links are pivotal on transverse axes the connection of the upper link to the tractor is pivotal on a transverse axis so that operation of said tractor-mounted motor vertically adjusts the links, member and forward end of the draft tongue in unison.

4. The invention defined in claim 1, in which the member upper portion is movable fore and aft on the draft links, the remote motor is connected between said member upper portion and the tractor to move said upper portion and the other force-transmitting means is connected between said member and the draft tongue portion.

5. The invention defined in claim 4, in which the tractor includes a tractor-mounted motor for vertically adjusting the draft links, the connections of the member to the draft links and to the remote motor are pivotal on transverse axes and the connection of the remote motor to the tractor is pivotal on a transverse axis so that operation of said tractor-mounted motor vertically adjusts the draft links, the remote motor, the member and the forward end of the draft tongue in unison.

6. The invention defined in claim 1 in which the tractor includes a tractor-mounted fluid motor operative by said control means for selectively vertically adjusting the draft links, and selective means is provided for operating either motor exclusively of the other.

7. The invention defined in claim 6, in which the selective means includes a valve for selectively conditioning the remote motor for operation or for immobilization and a mechanical lock for selectively freeing or locking the tractor-mounted motor.

8. The invention defined in claim 6, in which the selective means includes a first valve for selectively conditioning the remote motor for operation or for immobilization and a second valve for selectively porting or blocking fluid pressure to the tractor-mounted motor.

9. The invention defined in claim 1, in which the tractor includes a rearwardly extending power take-off shaft at a level below that of the rear ends of the draft links and said member lower portion depends below the level of the power take-off shaft to provide a low hitch connection for the draft tongue, said member having an opening therethrough in substantially coaxial alinement with the power take-off shaft.

10. The invention defined in claim 1, wherein the power lift system and control means incorporate a draft control mechanism and the lower links are movable fore and aft on the tractor in response to changes in draft forces and are connected into the draft control mechanism to signal changes in draft forces to said mechanism for operating the remote motor.

11. The invention defined in claim 1, wherein the tractor includes a tractor-mounted fluid motor and the power lift system and control means incorporate a draft control mechanism and the lower links are movable fore and aft on the tractor in response to changes in draft forces and are connected into the draft control mechanism to signal changes in draft forces to said mechanism for operating the tractor motor, and selective means is operative on the system for causing said mechanism to operate the remote motor to the exclusion of the tractor motor.

12. The invention defined in claim 1, in which the lower portion of the member cooperates with the rear ends of the draft links to provide that part of the hitch means to which the forward end of the draft tongue is connected.

13. For a tractor and trailing implement wherein the tractor includes a hydraulic draft control system having a motor line controlled by a valve and vertically adjustable trailing lower draft link means rearwardly shiftable by tensional implement forces to operate the valve and the implement has ground-engaging means supporting the weight thereof and a rigid draft tongue draft-connected to the link means by means including a transverse pivot, the improvement comprising a generally upright member carried by the draft link means and rising therefrom to an upper portion, means for selectively fixing the draft links against vertical adjustment, first force-transmitting means connected between the member and a portion of the tongue rearwardly of said pivot, second force-transmitting means connected between the member upper portion and the tractor, and one of said force-transmitting means including a fluid motor connected to said motor line so as to operate as part of the draft control system as the valve is controlled by rearward shifting of the draft link means.

References Cited

UNITED STATES PATENTS

| | | | |
|---|---|---|---|
| 2,247,534 | 7/1941 | Von Schlegell | 172—7 |
| 3,022,831 | 2/1962 | Hess | 172—7 |
| 3,073,622 | 1/1963 | Merritt | 280—405 |
| 3,198,547 | 8/1965 | Annat. | |
| 3,275,084 | 9/1966 | Bunting | 172—9 |

LEO FRIAGLIA, Primary Examiner

U.S. Cl. X.R.

172—7